US012709660B2

(12) United States Patent
Griffin et al.

(10) Patent No.: US 12,709,660 B2
(45) Date of Patent: Aug. 18, 2026

(54) METHOD FOR FABRICATING A THERMOPLASTIC COMPOSITE STRUCTURE

(71) Applicant: CYTEC INDUSTRIES INC., Princeton, NJ (US)

(72) Inventors: James Martin Griffin, Orange, CA (US); Kingsley Kin Chee Ho, Wrexham (GB); James Francis Pratte, Wilmington, DE (US)

(73) Assignee: CYTEC INDUSTRIES INC., Lawrence, NJ (US)

( * ) Notice: Subject to any disclaimer, the term of this patent is extended or adjusted under 35 U.S.C. 154(b) by 1282 days.

(21) Appl. No.: 17/323,053

(22) Filed: May 18, 2021

(65) Prior Publication Data

US 2021/0269594 A1 Sep. 2, 2021

Related U.S. Application Data

(62) Division of application No. 15/394,952, filed on Dec. 30, 2016, now Pat. No. 11,034,795.

(Continued)

(51) Int. Cl.
*B32B 7/04* (2019.01)
*B29B 15/08* (2006.01)

(Continued)

(52) U.S. Cl.
CPC .............. *C08G 65/48* (2013.01); *B29B 15/08* (2013.01); *B29C 70/34* (2013.01); *B32B 5/022* (2013.01); *B32B 5/024* (2013.01); *B32B 5/06* (2013.01); *B32B 5/12* (2013.01); *B32B 5/16* (2013.01); *B32B 5/26* (2013.01); *B32B 7/04* (2013.01); *B32B 27/12* (2013.01); *C08G 65/46* (2013.01); *C08G 65/485* (2013.01); *C08J 5/042* (2013.01); *C08J 5/043* (2013.01); *C08J 5/046* (2013.01); *B29K 2071/00* (2013.01); *B29K 2995/0092* (2013.01); *B32B 2250/20* (2013.01); *B32B 2255/02* (2013.01); *B32B 2255/26* (2013.01); *B32B 2260/023* (2013.01); *B32B 2260/046* (2013.01); *B32B 2262/02* (2013.01); *B32B 2262/0253* (2013.01); *B32B 2262/0261* (2013.01); *B32B 2262/0269* (2013.01);

(Continued)

(58) Field of Classification Search
CPC ................................ C08G 65/48; B29B 15/08
See application file for complete search history.

(56) References Cited

U.S. PATENT DOCUMENTS 4,833,205 A * 5/1989 Bauman ................. C08J 9/0061 525/131
2007/0039683 A1* 2/2007 Morin ..................... B32B 27/12 156/307.3

(Continued)

*Primary Examiner* — Kristen A Dagenais
(74) *Attorney, Agent, or Firm* — Thi Dang

(57) ABSTRACT

Surface-treated polymeric particles which are dispersible in water or an aqueous solution without the aid of any surfactant. Surface treatment of hydrophobic polymeric particles is carried out to increase the surface energy and to render the surfaces of the particles hydrophilic, thereby eliminating the need for a surfactant to disperse the polymeric particles in water or an aqueous solution. As such, a surfactantless slurry can be formed from the surface-treated particles for the fabrication of fiber-reinforced thermoplastic composite structures.

10 Claims, 2 Drawing Sheets

Related U.S. Application Data

(60) Provisional application No. 62/272,940, filed on Dec. 30, 2015.

(51) Int. Cl.

| | |
|---|---|
| ***B29C 70/34*** | (2006.01) |
| ***B32B 5/02*** | (2006.01) |
| ***B32B 5/06*** | (2006.01) |
| ***B32B 5/12*** | (2006.01) |
| ***B32B 5/16*** | (2006.01) |
| ***B32B 5/26*** | (2006.01) |
| ***B32B 27/12*** | (2006.01) |
| ***C08G 65/46*** | (2006.01) |
| ***C08G 65/48*** | (2006.01) |
| ***C08J 5/04*** | (2006.01) |
| *B29K 71/00* | (2006.01) |

(52) U.S. Cl.

CPC ... *B32B 2262/0276* (2013.01); *B32B 2262/10* (2013.01); *B32B 2262/101* (2013.01); *B32B 2262/105* (2013.01); *B32B 2262/106* (2013.01); *B32B 2262/14* (2013.01); *B32B 2307/50* (2013.01); *B32B 2307/54* (2013.01); *B32B 2307/728* (2013.01); *B32B 2307/73* (2013.01); *B32B 2605/08* (2013.01); *B32B 2605/18* (2013.01); *C08J 2371/10* (2013.01)

(56) References Cited

U.S. PATENT DOCUMENTS

2007/0269363 A1* 11/2007 Murai .................. D06M 13/17 428/367

2015/0118431 A1* 4/2015 Mesic .................. D21H 13/14 264/331.12

* cited by examiner

METHOD FOR FABRICATING A THERMOPLASTIC COMPOSITE STRUCTURE

The instant application is a divisional application of U.S. application Ser. No. 15/394,952 filed on Dec. 30, 2016, which claims the benefit of prior U.S. Provisional Application No. 62/272,940 filed on Dec. 30, 2015, both of which are is incorporated herein by reference.

DETAILED DESCRIPTION

Figure 1:
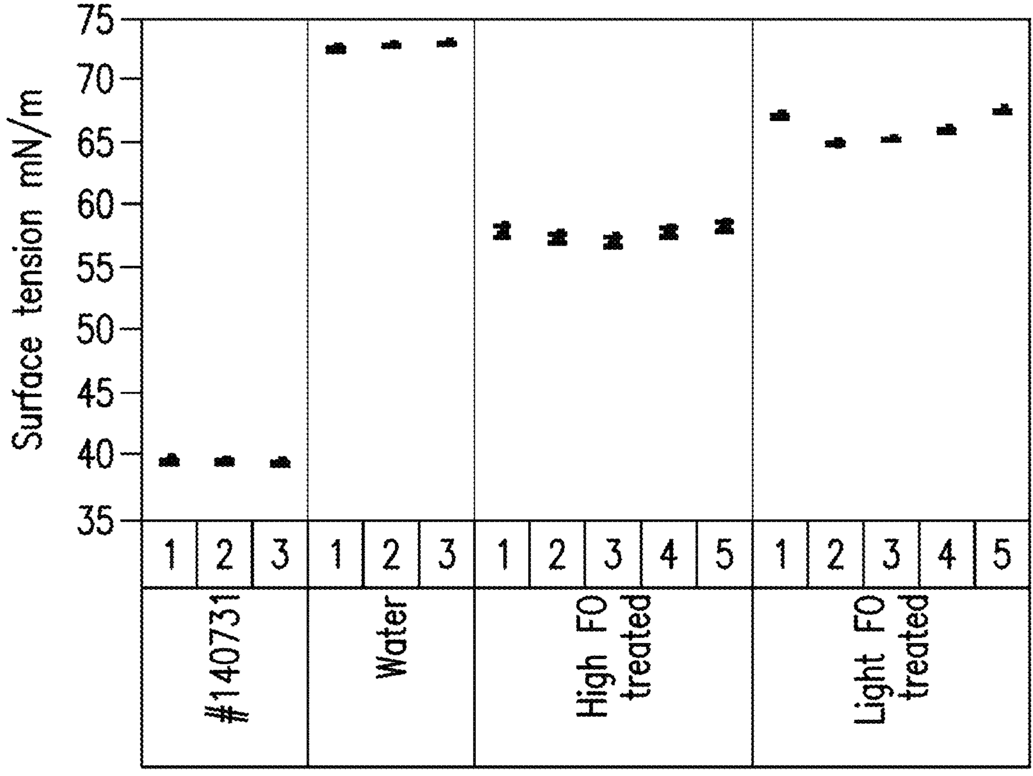
FIG. 1 is a graph showing the measurement of surface tension of untreated and surface-treated PEKK powders dispersed in water, measured as a function of time, as compared to deionized water.

The present disclosure pertains to surface-treated polymeric particles which are dispersible in water or an aqueous solution without the aid of any surfactant. It has been discovered that surface treatment of hydrophobic polymeric particles (or powder) to increase the surface energy and to render the surfaces of the particles hydrophilic eliminates the need for a surfactant to disperse the powder in water. As such, a surfactantless slurry can be formed from the surface-treated particles for the fabrication of fiber-reinforced thermoplastic composite structures. The use of surfactantless slurry improves the efficiency of the fabrication process and results in composite structures with no surfactant contamination.

The surface-treated polymeric particles are produced from surface treating particles of hydrophobic or water-insoluble polymers, particularly, thermoplastic polymers, so as to increase the hydrophilicity or wettability of the particles' external surfaces. "Hydrophilicity" is a characteristic of materials exhibiting an affinity for water. As such the hydrophilic surfaces of the surface-treated particles are wettable by aqueous liquids (i.e., liquids comprising water) in contact with the surfaces. The hydrophilicity of the particles is related to their dispersive surface energy that can be measured by an Inverse Gas Chromatography (IGC) instrument. In some embodiments, the surface-treated polymeric particles have a dispersive surface energy of less than 50 $mJ/m^2$, particularly, from about 30 $mJ/m^2$ to about 49 $mJ/m^2$, including from about 33 $mJ/m^2$ to about 46 $mJ/m^2$.

Each of the surface-treated polymeric particles can be described as having a core of hydrophobic or water-insoluble polymer and a hydrophilic outer surface. The hydrophobic core constitutes at least 80%, for example, 80%-99%, by volume of the entire particle.

The surface-treated polymeric particles disclosed herein may have a mean particle size (d50) of about 100 μm or less, for example, within the range of about 1 μm to about 100 μm, as measured in a wet dispersion by laser diffraction. For example, the d50 particle size may be measured using Malvern Mastersizer 2000 particle size analyzer which operates in the 0.002 nanometer-2000 micron range. "d50" represents the median of the particle size distribution, or alternatively is the value on the distribution such that 50% of the particles have a particle size of this value or less. For spherical particles (with aspect ratio of approximately 1:1), the mean particle size refers to its diameter. For non-spherical particles, the mean particle size refers to the largest cross sectional dimension of the particles. With reference to particles, the term "aspect ratio" refers to the ratio of the largest cross sectional dimension of the particle to the smallest cross sectional dimension of the particle.

Prior to surface treatment, the untreated particles are particulate forms of hydrophobic or water-insoluble thermoplastic polymers selected from: polyaryletherketones (PAEKs); polyamides, including semi-aromatic polyamide such as polypthalamide (PPA); thermoplastic poly-olefins; poly(phenylene oxide) (PPO), polyvinylidene difluoride (PVDF), polytetrafluoroethylene (PTFE), polyimides; polyetherimide (PEI); polyamide-imides; poly aryl sulfones including PES, PEES; polyphenylene sulfide (PPS), polyethethylene terephthalate (PET), polyethylene terephthalate glycol (PETG); polyoxymethylene (POM); liquid crystalline polyester (LCP); polymethylmethacrylate (PMMA); polylactic acid or polylactide; poly-L-lactic acid or poly-L-lactide; polyglycolic acid; co-polymers and combinations thereof.

In some embodiments, the starting hydrophobic particles prior to surface treatment are particles of polyaryletherketones (PAEKs). PAEKs are polymers containing the unit —Ar—O—Ar—C(═O)—, where Ar is an aromatic moiety. They are characterized by aryl groups that are linked via ether, carbonyl (ketone), sulphone or imide groups.

Each aromatic moiety (Ar) in the PAEK polymer repeating unit may be independently selected from substituted and unsubstituted mononuclear aromatic moieties (e.g. phenylene) and substituted and unsubstituted polynuclear aromatic moieties. The term "polynuclear" is considered to encompass fused aromatic rings such as naphthalene and non-fused rings such as biphenyl, etc. In some embodiments, Ar is phenylene (Ph), e.g. unsubstituted phenylene.

The phenylene and polynuclear aromatic moieties (i.e. "Ar") may contain substituents on the aromatic rings. Such substituents would be readily understood by the skilled person and should not inhibit or otherwise interfere with the polymerisation reaction to any significant extent. Typical substituents may include, for example, phenyl, halogen (e.g. F, Cl, Br, I), ester, nitro, cyano and the like.

In cases where Ar is substituted, the substituents are preferably pendant to the chains, rather than in the backbone, i.e. not bonded to a carbonyl carbon atom of a ketone linkage nor to an oxygen atom of an ether linkage. Thus, in one embodiment, the ketone linkages (i.e. the carbon atoms of the carbonyl group) are directly attached to carbon atoms, especially to carbon atoms of adjacent aromatic groups (i.e. to aromatic carbons). Similarly, the oxygen atoms of the ether linkages are preferably attached to carbon atoms, especially to aromatic carbon atoms of adjacent aromatic groups.

Homopolymers of the above repeat units or copolymers of the above repeat units with each other (e.g. PEKK-PEKEKK-PEKK) and with imide or sulphone units are encompassed. Copolymers include alternating, periodic, statistical, random and block copolymers.

Specific examples of PAEKs may include, but are not limited to, poly (ether ketone) (PEK), poly (ether ether ketone) (PEEK), poly (ether ketone ketone) (PEKK), poly (ether ether ketone ketone) (PEEKK), and poly(ether ketone ether ketone ketone) (PEKEKK), poly (ether ether ketone ether ketone) (PEEKEEK), poly (ether diphenyl ketone) (PEDK), poly (ether diphenyl ether ketone) (PEDEK), poly (ether diphenyl ether ketone ketone) (PEDEKK), poly (ether ketone ether naphthalene) (PEKEN).

In one embodiment, the surface-treated particles of PAEK polymer or copolymer thereof comprises fluoro-oxidized outer surfaces. In another embodiment, the surface-treated particles of PAEK polymer or copolymer thereof comprise polar functional groups selected from carbonyl and hydroxyl on their outer surfaces, and may further comprise fluorine atoms on the outer surfaces.

Surface treatments to render the surfaces of hydrophobic/water-insoluble particles hydrophilic may be selected from conventional methods such as gaseous oxidation, including fluoro-oxidation, plasma or corona treatment with various atmospheres or under vacuum, chemical oxidation or reduction using acids or bases (wet chemistry), irradiation using ion beams or other radiation sources, and chemical grafting.

For surface treatment by plasma, a plasma gas containing oxygen, for example, pure oxygen, air, water vapor, or mixtures thereof may be used. The oxygen-containing plasma treatment can affix the chemical groups consisting of hydroxyl groups, carbonyl groups, carboxyl groups, and mixtures thereof, thereby rendering the substrate more polar and hydrophilic. Moreover, oxidative reagents such as ozone, peroxides, oxygen-fluorine ($O_2/F_2$) or air fluorine mixtures, and the like, can render the particle surface more polar and hydrophilic. Treatment with a plasma gas to make the substrate more polar and hydrophilic while creating free radicals on the surface, may be carried out, for example, by means of non-reducing gases such as argon, or mixture of argon and ammonia.

The term "plasma" as used herein refers to the state of partially or completely ionized gas. A plasma consists of charged ions (positive or negative), negatively charged electrons, and neutral species, radicals and excited species. As known in the art, a plasma may be generated for example by a power source such as an alternating current (AC), a direct current (DC) low frequency (LF), audio frequency (AF), radio frequency (RF) and microwave power source. Plasma treatment may include positioning the polymeric particles in the afterglow region of a gas plasma having a main region and an afterglow region.

Plasma treatment conditions may include power levels from about 1 watt to about 1000 watts, including about 5 watts to about 500 watts. Exposure time may be about 5 seconds to 12 hours, including about 1 minute to 2 hours, and about 5 minutes to about 30 minutes.

In one embodiment, plasma treatment is used to modify the surfaces of PAEK particles. The plasma forming gas may be selected from the group consisting of oxygen, hydrogen, nitrogen, air, helium, neon, argon, carbon dioxide and carbon monoxide, methane, ethane, propane, tetrafluoromethane, and hexafluoroethane or a combination thereof. In one embodiment, plasma treatment is used as surface treatment of PAEK particles, e.g. PEKK particles. The preferred plasma forming gas used to treat the surfaces of PAEK particles is an oxygen-containing gas, either oxygen alone or a mixture of oxygen with one or more additional plasma forming gases.

In another embodiment, a fluoro-oxidation process is used to modify the surfaces of PAEK particles, which normally have a dispersive surface energy of greater than about 50 $mJ/m^2$, e.g. 51 $mJ/m^2$ to 60 $mJ/m^2$. Fluoro-oxidation can be carried out by exposing the polymeric particles either simultaneously or sequentially with a reactive fluorine gas source and an oxidation source. In a preferred embodiment, the reactive gas is a mixture containing fluorine ($F_2$) and oxygen ($O_2$) together with an inert carrier such as nitrogen ($N_2$). The relative concentrations of fluorine and oxygen can vary in the reactive gas composition. The absolute concentrations depend both on the respective volume percent concentrations and the gas pressure. For example, the reactivity of a gaseous composition with 12% by volume $F_2$ at 1.0 atmosphere pressure approximately equals the reactivity of a gaseous composition with 24% by volume $F_2$ at 0.5 atmosphere or 4% by volume $F_2$ at 3.0 atmospheres.

The fluoro-oxidation may also be carried out in a low pressure or cold plasma which may contain gaseous mixtures of $F_2/O_2$, $CF_4/O_2$, $NF_3/O_2$, other fluorocarbons mixed with oxygen or air, or fluorine-containing compounds or their mixtures that yield fluorine and oxygen radicals or active species in the plasma.

Processing conditions such as temperature, pressure, concentrations of the fluorine and oxygen, and exposure time can be selected by those of ordinary skill in the art so as to achieve the desired hydrophilicity and dispersive surface energy. Contact times are generally determined by the degree of surface modification desired.

Surfactantless Slurry

The surface-treated polymeric particles of the present disclosure can be dispersed in water or an aqueous solution without the aid of any surfactant, thereby forming a surfactantless slurry. The surfactantless slurry of dispersed particles may be used to impregnate a layer of reinforcement fibers so as to form a composite material, particularly a thermoplastic prepreg.

To form a slurry of dispersed polymeric particles that is suitable for impregnating reinforcement fibers, the particles may be present in an amount of about 0.5% to about 60% by weight based on the total weight of the slurry. The slurry of dispersed particles may optionally contain/or replace by an organic solvent that is miscible with water such as alkyl alcohols, e.g. methanol, and acetone, in addition to water. If present, the amount of solvent may be in range of about 0.1% to about 50% based on total weight of slurry.

Composite Structures and Manufacturing thereof

The surfactantless slurry of dispersed polymeric particles can be combined with reinforcement fibers to fabricate fiber-reinforced composite materials and structures. Without having to use a surfactant for dispersing the polymeric particles, a safer and more economical manufacturing process is possible.

According to one embodiment, the method for fabricating a thermoplastic composite laminate (or structure) includes:

(a) applying the surfactantless slurry described above onto a first layer of reinforcement fibers to distribute the particles onto the fibers, forming a first particle-coated layer;
(b) placing an additional layer of reinforcement fibers on the first particle-coated layer;
(c) applying the surfactantless slurry to the additional layer of reinforcement fibers to distribute the particles onto the fibers, forming a subsequent particle-coated layer;
(d) drying the particle-coated layers; and
(e) consolidating the particle-coated layers by applying heat and pressure.

Steps (b) and (c) may be repeated to build up a laminate with a desired thickness prior to drying at (d). After consolidation, the resulting composite structure is an integrated laminate containing layers of reinforcement fibers embedded in a polymer matrix.

The slurry of dispersed particles may be applied onto the layer of reinforcement fibers by pouring, spraying, spreading, brushing, or any conventional coating technique, so as to distribute the dispersed particles onto the exposed surfaces of the fibers.

Consolidation includes placing the layup of particle-coated fiber layers in a pre-heated mould or press and subjecting the layup to heat and pressure for an appreciable time sufficient to cause the polymeric/thermoplastic material to flow and bond together the layers of material to be laminated, and allowing the mould or press to cool sufficiently to avoid distortion of the moulded structure before removal of the laminate from the mould/press.

In one embodiment, a thermoplastic prepreg may be manufactured by applying the surfactantless slurry of surface-treated thermoplastic particles onto a layer of reinforcement fibers, drying the slurry-treated fiber layer, and consolidating the same by applying heat and pressure. The layer of reinforcement fibers may be in the form of continuous unidirectionally aligned fibers, woven fabric, nonwoven fabric, multi-axial fabric, or nonwoven mat of randomly arranged fibers. The resulting prepreg contains reinforcement fibers embedded in a thermoplastic polymer matrix.

The reinforcement fibers for fabricating composite structures and prepregs may take the form of chopped fibers, continuous fibers, filaments, tows, bundles, nonwoven or woven fabric plies, nonwoven mats of randomly arranged fibers, and combinations thereof. Continuous fibers may further adopt any of unidirectional (aligned in one direction), multi-directional (aligned in different directions) fibers. Continuous fibers may be in the form of tows, each tow composed of a plurality of filaments, e.g. thousands of filaments. Unidirectional fiber tows may be held in position by cross-tow stitches. The layer of reinforcement fibers may be a ply of multi-axial, non-crimped fabric (NCF). NCF consists of non-crimped fiber layers, which are connected by stitching yarns. Each fiber layer in the NCF consists of continuous unidirectional fibers that are oriented in a direction different from the fibers in another adjacent fiber layer. The reinforcement fiber composition includes, but are not limited to, glass (including Electrical or E-glass), carbon, graphite, aramid, polyamide, high-modulus polyethylene (PE), polyester, poly-p-phenylene-benzoxazole (PBO), boron, quartz, basalt, ceramic, and combinations thereof.

For the fabrication of high-strength composite materials, e.g. for aerospace and automotive applications, it is preferred that the reinforcing fibers have tensile strength of greater than 3500 MPa. Carbon, glass and aramid fibers are particularly suitable as such reinforcing fibers.

In certain embodiments, the content of the reinforcement fibers in the composite laminate, structure or prepreg is at least 50% by weight, for example, about 50% to about 80% by weight based on the total weight of the laminate, structure or prepreg.

EXAMPLES

Example 1

Fluoro-Oxidation of PEKK Particles

Despite that every repeating unit in the molecule of PEKK (polyetherketoneketone) has two C═O and one C—O—C groups in the structure, PEKK powder is still considered hydrophobic in nature and is not readily dispersible in water without the aid of surfactants. A fluoro-oxidation (FO) process was carried out to enhance the wettability or hydrophilicity of the PEKK polymer particles by introducing polar groups to the surfaces of the polymer particles.

PEKK polymer (Cypek™ FC (Peak melt point=338° C.) from Cytec Industries Inc.) was ground to form a powder with a particle size (D50) of about 17 microns. The PEKK powder was exposed to a fluoro-oxidation treatment in two different levels to yield lightly-treated fluoro-oxidized powder and highly-treated fluoro-oxidized powder. The resulting fluoro-oxidized PEKK powder along with untreated powder (as control) were analyzed using various techniques as described below.

Inverse Gas Chromatography (IGC)

Various PEKK powder samples (0.3 g each) were packed into separate pre-silanised glass columns (300 mm×4 mm ID) with silanised glass wool packing at each end to prevent movements. The experiments were conducted using a SMS-iGC 2000 system (Surface Measurement Systems, London, UK). Five n-alkanes (heptane, octane, nonane, decane and undecane) were used to measure the dispersive component of the surface energy. Polar components were measured using ethyl acetate and dichloromethane as polar probes. These two probes are normally used as mono polar acid/base probes.

X-Ray Photon Spectroscopy (XPS)

X-ray photoelectron spectra were recorded on a Kratos AXIS HSi instrument equipped with a Mg Kα anode and charge neutralizer. An analyzer pass energy of 11.75 eV was used for high resolution scans and 187.85 eV for wide scans, both with an X-ray power of 400 W. Elemental compositions were determined using the appropriate response factors from the wide scans. Spectral deconvolution was undertaken using CasaXPS for background-subtracted spectra. Comparative reference values for functional group binding energies were taken from the NIST Standard Reference Database [Naumkin AV, Kraut-Vass A, Gaarenstroom W, Powell CJ. "NIST Standard Reference Database 20, Version 4.1"].

Surface Tension

Surface tension measurements were carried out on a Processor-Tensiometer K100 by Kruss Advancing Surface Science at 22□C while following the ISO 1409 standard.

Particle Size

Particle sizes of the untreated PEKK control powder as well as the lightly- and heavily-treated PEKK powders were measured using a Malvern Mastersizer 2000.

The dispersive surface energy of the surface-treated and untreated PEKK powders was measured and the results are reported in Table 1.

TABLE 1

| | | Dispersive Surface Energy (mJ/m$^2$) | | | Specific Energy-Acid/Base (kJ/mol) |
|---|---|---|---|---|---|
| ID No. | Sample | C6-C8 | C6-C9 | C7-C9 | Dichloromethane |
| 1 | PEKK untreated | 54.5 | 52.3 | | |
| | Repeat | 53.8 | 51.7 | 53.04 | 14.3 |
| 2 | PEKK - lightly treated | 45.6 | 43.3 | | |
| | Repeat | 46.3 | 44.0 | 44.76 | 8.6 |
| 3 | PEKK - highly treated | 37.1 | 34.6 | 34.1 | |
| | Repeat | 37.47 | 34.87 | 33.9 | 6.5 |

A drop in dispersive surface energy was measured for the fluoro-oxidized PEKK powder. A lower measured dispersive surface energy can be attributed to the lower number of energy sites responsive to the organic solvents in gaseous form. This is in agreement with the prediction that fluoro-oxidation treatment introduces carbonyl and hydroxyl functionalities onto the particle surfaces, which in return are not compatible with organic gaseous environment. A decrease in dispersive surface suggests an increase in non-polar groups present on the surface. In contrast, a higher specific acid/base specific energy, and in particular, the extrapolated acidic component indicates that more acidic functionalities were present as a result of fluoro-oxidation treatment.

The influence of fluoro-oxidation on PEKK powder was investigated by XPS. The elemental compositions of the PEKK polymers are presented in Table 2.

TABLE 2

| Sample | C1s | N1s | O1s | F1s | Si2p | Cl2p | O:C |
|---|---|---|---|---|---|---|---|
| Control | 86.9 | — | 12.7 | — | 0.37 | — | 0.15 |
| Light FO-treated | 63.3 | 0.96 | 20.6 | 14.3 | 0.75 | 0.07 | 0.32 |
| Heavily FO-treated | 58.9 | 0.95 | 21.6 | 17.7 | 0.81 | — | 0.37 |

The original untreated PEKK powder (control) contained a relative amount of heteroatom content, predominantly oxygen, along with a small amount of surface silicon impurities, but is entirely fluorine-free. Fluoro-oxidation treatment resulted in significant changes in the overall surface composition and in particular the introduction of further heteroatoms, presumably via a blend of fluorine and oxygen. The fluorine content rapidly increased from 0 to 14.3% after the PEKK was lightly treated. After heavy fluoro-oxidation treatment (double the duration of light treatment), although the level of surface fluorine increased further by 3.4% to reach 17.7%, the surface oxygen and nitrogen remained largely unchanged. A measure of the changes in surface polarity/hydrophobicity can also be garnered by examining the evolution of the O:C ratio across the series. This shows a sharp increase from 0.15 to 0.37 following the longest fluoro-oxiddation treatment, consistent with a sharp rise in the surface hydrophilicity, which governs why the treated PEKK powder was readily dispersible in deionized water without the aid of any surfactants.

XPS spectra revealed that the fluoro-oxidation treatment of PEKK powder induced carbonylation of surface hydroxyls. XPS spectra also revealed that the treatment of PEKK powder resulted in the introduction of hydrophilic R-Ox groups. Overall, the data shows that the fluoro-oxidation treatment resulted in a change in surface energy of the PEKK powder.

Example 2

Surfactantless Slurry of Dispersed Particles

When untreated PEKK powder was added to deionized (DI) water (without agitation), a white froth was formed on the surface of the water with the PEKK powder sitting on top while the bulk of the water remained transparent. In comparison, when the fluoro-oxidized PEKK powder (lightly- and heavily treated) described in Example 1 was added to DI water, the polymer sedimented into the water instantly. Furthermore, after 1 min and 5 min of agitation, the suspensions can be described as more stable visually and are in agreement to measurements reported for surface tension measured as a function of time.

FIG. 1 shows the surface tension of untreated and surface-treated PEKK powders dispersed in water, measured as a function of time, as compared to deionized water. The surface tension on measured deionized water was 72 mN/m. A slurry containing 5 wt % untreated PEKK particles (#140731) measured a surface tension close to 40 mN/m. Both lightly-treated ("Light FO") and heavily-treated ("High FO") PEKK particles exhibited higher surface tension as compared to untreated particles at a slurry concentration of 5 wt %, which indicates more hydrophilic in nature. As a result, both lightly- and heavily-treated PEKK particles were readily dispersible in DI water without the aid of any surfactant.

Example 3

Manufactured Thermoplastic Laminates 40 g of lightly-treated fluoro-oxidized PEKK powder disclosed in Example 1 was dispersed into 80 g of deionized (DI) water, forming a surfactantless slurry with 33% PEKK by weight. The slurry was divided into 15 g portions. Seven (19 cm×9 cm) fabric plies were cut from a woven carbon fabric (T300 desized 5HS fabric from Cytec Carbon Fiber, South Carolina, USA) with an areal weight of 280 gsm ($g/m^2$). A first fabric ply was placed on a mold and a portion of the slurry was deposited onto the fabric ply to coat the top surface of the entire ply. Each of the other six fabric plies was laid on top of the previous ply and coated with a portion of the slurry. The wet layup of particle-coated fabrics was enclosed by a FEP vacuum bag and placed in a fan oven at 110° C. for 2 hours to evaporate off the water. The dried layup was then transferred into a 2 mm thick release coated stainless steel frame and preheated to 375° C. for 15 min. After which, 5 tons of pressure was applied to the layup and held for 20 min at 375° C. to consolidate the layup. The resulting consolidated laminate was then cooled to 250° C. while the pressure was maintained before removing the laminate from the mold.

Figure 2:
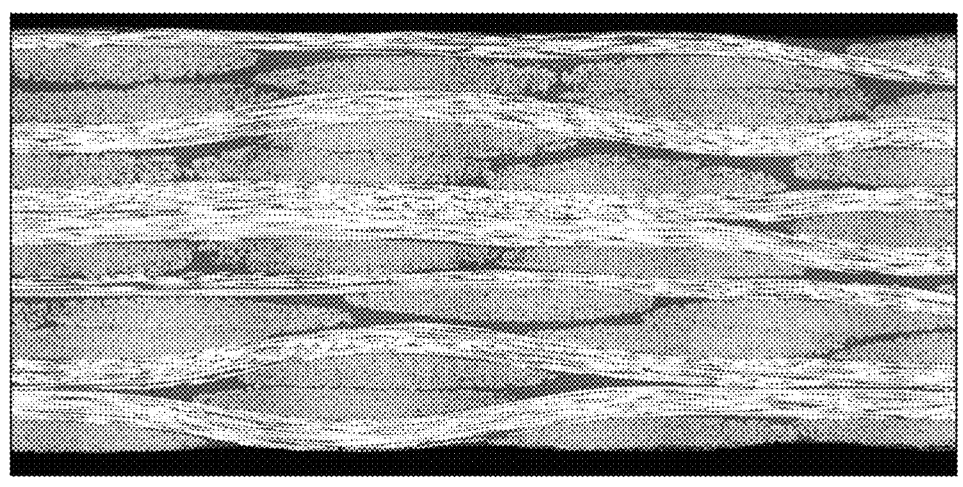
FIG. 2 is an optical mircograph image showing a cross-sectional view of a consolidated PEKK laminate produced from lightly-treated fluoro-oxidized PEKK powder.

FIG. 2 is an optical image showing a cross-sectional view of the consolidated PEKK laminate produced from lightly-treated fluoro-oxidized PEKK powder.

Figure 3:
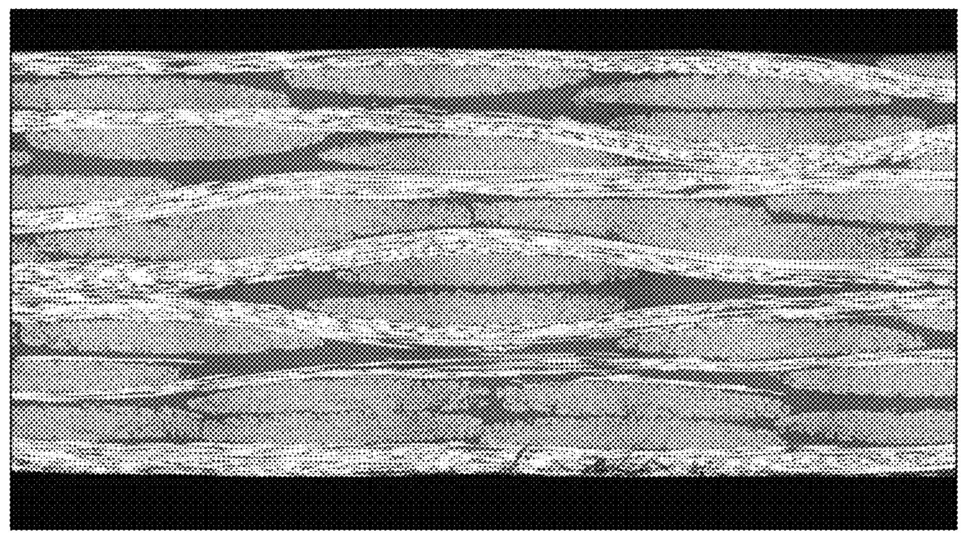
FIG. 3 is an optical micrograph image showing a cross-sectional view of a consolidated PEKK laminate produced from heavily-treated fluoro-oxidized PEKK powder.

The above manufacturing process was repeated using heavily-treated fluoro-oxidized PEKK powder disclosed in Example 1. FIG. 3 is an optical image showing a cross-sectional view of the consolidated PEKK laminate produced from heavily-treated fluoro-oxidized PEKK powder.

The micrographs reveal that the consolidated PEKK laminates appeared to be porosity-free, which indicates a good degree of consolidation has occurred. Overall, the data shows that it is possible to disperse PEKK powder in water without a surfactant if the PEKK powder has been surface treated to increase surface hydrophilicity and dispersive energy. The surface tension measurements also support this conclusion. Consequently, it was then possible to manufacture defect-free PEKK composite laminates.

Terms, Definitions, and Abbreviations

In the present disclosure, the modifier "approximately" and "about" used in connection with a quantity is inclusive of the stated value and has the meaning dictated by the context, (e.g., includes the degree of error associated with measurement of the particular quantity). For example, a number following "about" can mean the recited number plus or minus 0.1% to 1% of that recited number. The suffix "(s)" as used herein is intended to include both the singular and the plural of the term that it modifies, thereby including one or more of that term (e.g., the metal(s) includes one or more metals). Ranges disclosed herein are inclusive of the endpoints and all intermediate values of the ranges, for example, "1% to 10%" includes 1%, 1.5%, 2%, 2.5%, 3%, 3.5%, etc.

What is claimed is:

1. A method for fabricating a thermoplastic composite structure, comprising:

(a) exposing particles of hydrophobic thermoplastic polymer to a surface treatment that renders the outer surfaces of the particles hydrophilic, thereby forming surface-treated particles with outer surfaces having a dispersive surface energy of less than 50 $mJ/m^2$, as measured by Inverse Gas Chromatography (IGC);

(b) forming an aqueous slurry comprising the surface-treated particles without adding any surfactant;

(c) applying the aqueous slurry to a first layer of reinforcement fibers to distribute the particles onto the fibers, forming a first particle-coated layer;

(d) placing an additional layer of reinforcement fibers on the first particle-coated layer;

(e) applying the aqueous slurry to the additional layer of reinforcement fibers to distribute the particles onto the fibers, forming a subsequent particle-coated layer;

(f) drying the particle-coated layers; and (g) consolidating the particle-coated layers by applying heat and pressure.

2. The method of claim 1 further comprising:

repeating (d) and (e) to build up a composite laminate prior to drying at (f).

3. The method according to claim 1, wherein the reinforcement fibers are in the form of continuous unidirectionally aligned fibers, woven fabric, nonwoven fabric, or nonwoven mat of randomly arranged fibers.

4. The method according to claim 1, wherein the reinforcement fibers are selected from carbon fibers, aramid fibers, glass fibers, and combinations thereof.

5. The method according to claim 1, wherein the particles of hydrophobic thermoplastic polymer at (a) are particles of a thermoplastic material selected from: polyaryletherketones (PAEKs); polyamides; thermoplastic poly-olefins; poly(phenylene oxide) (PPO), polyvinylidene difluoride (PVDF), polytetrafluoroethylene (PTFE), polyimides; polyetherimide (PEI); polyamide-imides; poly aryl sulones including PES, PEES; polyphenylene sulfide (PPS), polyethethylene terephthalate (PET), polyethylene terephthalate glycol (PETG); polyoxymethylene (POM); liquid crystalline polyester (LCP); polymethylmethacrylate (PMMA); polylactic acid or polylactide; poly-L-lactic acid or poly-L-lactide; polyglycolic acid; co-polymers and combinations thereof.

6. The method according to claim 5, wherein the particles of hydrophobic thermoplastic polymer at (a) are particles of PAEK polymer or copolymer thereof.

7. The method according to claim 1, wherein the surface treatment at (a) is carried out by exposing the particles to a gaseous atmosphere comprising oxygen and fluorine.

8. The method according to claim 1, wherein the surface-treated particles after surface treatment at (a) have a mean particle size (d50) of about 100 μm or less as measured by laser diffraction.

9. The method according to claim 1, wherein the surface-treated particles in the aqueous slurry at (b) are the only solids in the slurry.

10. The method according to claim 1, wherein the aqueous slurry at (b) comprises about 0.5% to about 60% by weight of the surface-treated particles, based on the total weight of the slurry.

* * * * *